US012592855B2

(12) United States Patent
Upadhyay et al.

(10) Patent No.: US 12,592,855 B2
(45) Date of Patent: Mar. 31, 2026

(54) NETWORK INTENT ORCHESTRATION IN ENTERPRISE FABRICS

(71) Applicant: Cisco Technology, Inc., San Jose, CA (US)

(72) Inventors: Sharmishtha Upadhyay, Fremont, CA (US); Manish Jiwansingh Mehra, Los Altos, CA (US); Abhishek Vijay Kulkarni, San Jose, CA (US); Balaji Sundararajan, Fremont, CA (US); Upendar Surabhi, Fremont, CA (US); Bhairav Dutia, Santa Clara, CA (US); Ankur Bhargava, Pleasanton, CA (US); Basavaraju Halappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 66 days.

(21) Appl. No.: 18/440,892

(22) Filed: Feb. 13, 2024

(65) Prior Publication Data

US 2025/0202765 A1 Jun. 19, 2025

Related U.S. Application Data

(60) Provisional application No. 63/610,222, filed on Dec. 14, 2023.

(51) Int. Cl.
*H04L 41/0813* (2022.01)
(52) U.S. Cl.
CPC ................................. *H04L 41/0813* (2013.01)

(58) Field of Classification Search
CPC .................................................... H04L 41/0813
See application file for complete search history.

(56) References Cited

U.S. PATENT DOCUMENTS

| | | | |
|---|---|---|---|
| 2010/0180016 A1 | 7/2010 | Bugwadia | |
| 2014/0379881 A1* | 12/2014 | Bradley | H04L 41/08 709/221 |
| 2019/0230047 A1 | 7/2019 | McBride | |
| 2019/0394088 A1 | 12/2019 | Narayanan | |

(Continued)

FOREIGN PATENT DOCUMENTS

WO WO-2025041156 A1 * 2/2025 ......... H04L 41/0806

*Primary Examiner* — Chris Parry
*Assistant Examiner* — Steven C Nguyen
(74) *Attorney, Agent, or Firm* — Lee & Hayes, P.C.

(57) ABSTRACT

This disclosure describes techniques and mechanisms for optimizing configuration management in SD-WAN networks. The techniques may enable optimized configuration management, by maintaining a "single copy of config" that gets pushed across an enterprise network to different device models, consisting of different interface types and other nuances of hardware variations. The techniques also enable delivery of a cloud scale device type agnostic orchestration of network services intent. The techniques may also enable a controller to have the ability to identify the configuration intent of the user and generate a configuration based on what a network device can accept. Further the techniques may enable a controller to identify the relevance of a configuration expressed in user intent with regard to a network device, such that a user can be notified where the user intent cannot be met, thereby reducing configuration mistakes.

20 Claims, 7 Drawing Sheets

(56) References Cited

U.S. PATENT DOCUMENTS

| | | | |
|---|---|---|---|
| 2020/0403863 A1* | 12/2020 | A ........................ | G06F 16/9024 |
| 2021/0028980 A1* | 1/2021 | R ........................ | H04L 41/0816 |
| 2021/0318863 A1* | 10/2021 | Martin ................ | H04L 41/0806 |
| 2023/0198868 A1 | 6/2023 | Sundararajan | |

* cited by examiner

200

400

RECEIVE USER INTENT ASSOCIATED WITH CONFIGURATION OF DEVICE(S) IN A
NETWORK
402

GENERATE COMMON DEVICE CONFIGURATION
404

ACCESS DATA ASSOCIATED WITH THE DEVICE(S)
406

GENERATE CONFIGURATION(S) FOR EACH OF THE DEVICE(S)
408

SEND THE CONFIGURATION(S) TO THE DEVICE(S)
410

NETWORK INTENT ORCHESTRATION IN ENTERPRISE FABRICS

CROSS REFERENCE TO RELATED APPLICATIONS

This application claims priority to U.S. Provisional Patent Application No. 63/610,222, filed Dec. 14, 2023, the entire contents of which are incorporated herein by reference.

TECHNICAL FIELD

The present disclosure relates generally to the field of computer networking, and more particularly to optimizing configuration management within a SD-WAN network.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In enterprise networks, a user may have a desired network services intent, such as network services. However, without advanced details about hardware specifics, such as device form factors, device models, etc. to fulfill the configuration intent ahead of time, the desired user intent may fail. This mismatch of network intent as against what is available in hardware leads to undesirable failures that, in existing techniques, is not discovered until run time.

The devices in a network could range from a router managed by an ISP to an IoT device. As such, the user intent expressed may not get applied uniformly, resulting in errors occurring on certain devices that may have different interface(s) supported (e.g., GigabitEthernet, 4G LTE, etc.) or may have different default device behavior. In existing techniques, users need to create different templates for different device types when deploying a configuration change to the network. Given the number of device types, differences in hardware, etc., a user may end up needing to create extensive number of templates. This is not only difficult to manage and time consuming, this also causes operational challenges.

For example, in a software defined wide area network (SD-WAN), the same hardware may run on network devices that are located in different locations. However, the same hardware may support different types of interfaces based on the area of work the network device is performing. For instance, interfaces supported on network devices running in financial institutions may be different from interfaces supported on network devices running in government offices. Thus, when an end user needs to push a configuration to the different devices, existing mechanisms require the end user to create different configuration templates to account for each of the differences in hardware and/or interfaces between network devices in these different environments. As a result, a user may need to create thousands of templates in order to push configuration changes to a customer network. This becomes operationally, extremely complex, time consuming, and resource consuming.

Accordingly, there is a need for a simplified, streamlined way to manage configurations within a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
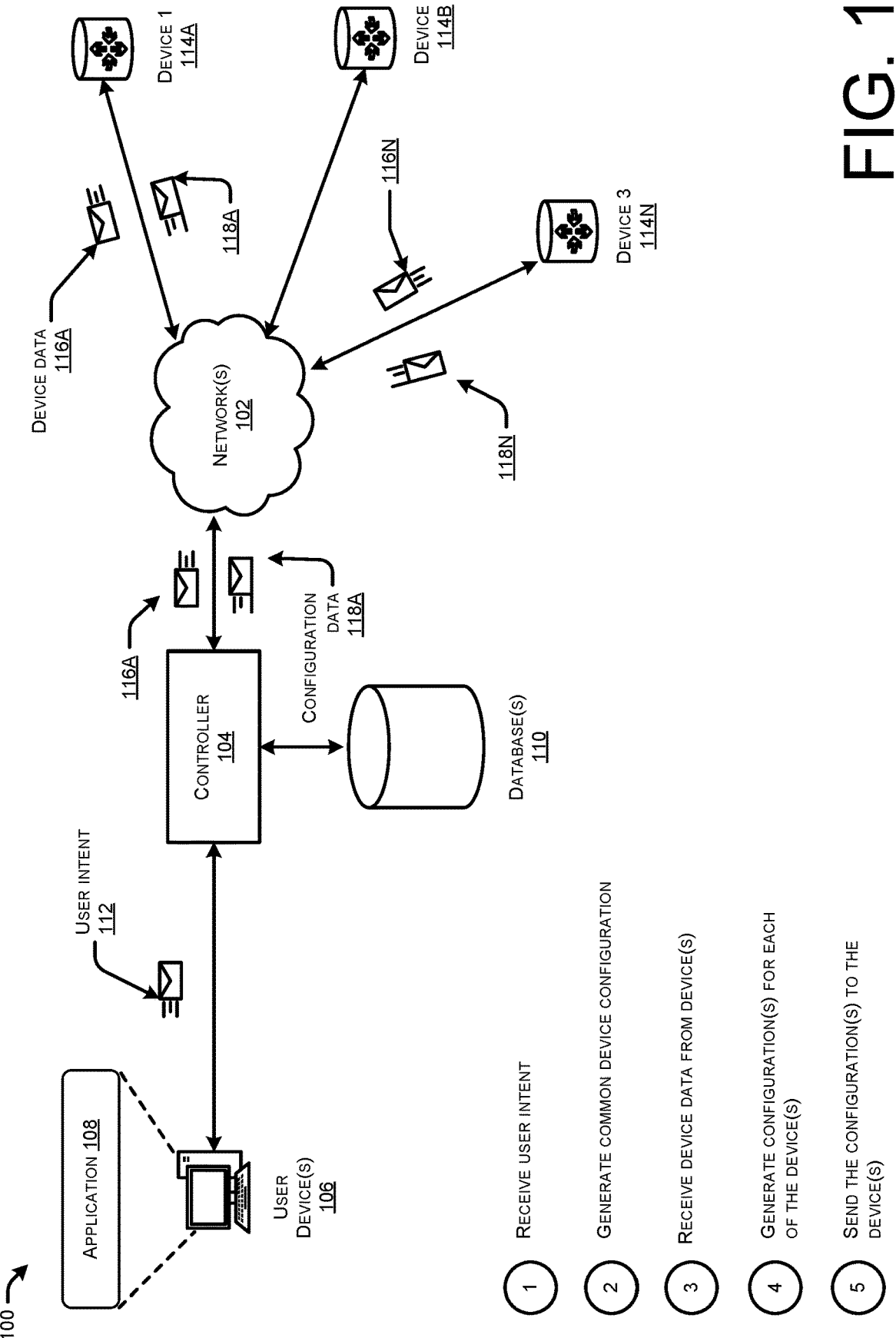
FIG. 1 illustrates a system-architecture diagram of an environment in which a system can optimize configuration management within SD-WAN networks.

The present disclosure relates generally to the field of computer networking, and more particularly to utilizing affinity routing to optimizing configuration management in networks.

A method to perform the techniques described herein may be implemented at least in part by a controller of a network and may include receiving user intent associated with configuration of one or more devices. The method may include generating, based on the user intent, a common device configuration. Further the method may include accessing first data associated with a first device of the one or more devices and second data associated with a second device of the one or more devices. Additionally, the method may include generating, based on the user intent, the first data, and the common device configuration, a first configuration associated with the first device. The method may also include generating, based on the user intent, the second data, and the common device configuration, a second configuration associated with the second device. The method may include sending, to the first device, the first configuration. The method may also include sending, to the second device, the second configuration.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

EXAMPLE EMBODIMENTS

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In enterprise networks, a user may have a desired network services intent, such as network services. However, without advanced details about hardware specifics, such as device form factors, device models, etc. to fulfill the configuration intent ahead of time, the desired user intent may fail. This mismatch of network intent as against what is available in hardware leads to undesirable failures that, in existing techniques, is not discovered until run time.

The devices in a network could range from a router managed by an ISP to an IoT device. As such, the user intent expressed may not get applied uniformly, resulting in errors occurring on certain devices that may have different interface(s) supported (e.g., GigabitEthernet, 4G LTE, etc.) or may have different default device behavior. In existing techniques, users need to create different templates for different device types when deploying a configuration change to the network. Given the number of device types, differences in hardware, etc., a user may end up needing to create extensive number of templates. This is not only difficult to manage and time consuming, this also causes operational challenges.

For example, in a software defined wide area network (SD-WAN), the same hardware may run on network devices that are located in different locations. However, the same hardware may support different types of interfaces based on the area of work the network device is performing. For instance, interfaces supported on network devices running in financial institutions may be different from interfaces supported on network devices running in government offices. Thus, when an end user needs to push a configuration to the different devices, existing mechanisms require the end user to create different configuration templates to account for each of the differences in hardware and/or interfaces between network devices in these different environments. As a result, a user may need to create thousands of templates in order to push configuration changes to a customer network. This becomes operationally, extremely complex, time consuming, and resource consuming.

Accordingly, there is a need for a simplified, streamlined way to manage configurations within a network.

This disclosure describes techniques and mechanisms for optimizing configuration management within a network. In some examples, the system may receive user intent associated with configuration of one or more devices. The system may generate, based on the user intent, a common device configuration. The system may access first data associated with a first device of the one or more devices and second data associated with a second device of the one or more devices. In some examples, the system may generate, based on the user intent, the first data, and the common device configuration, a first configuration associated with the first device and generate, based on the user intent, the second data, and the common device configuration, a second configuration associated with the second device. Additionally, the system may send, to the first device, the first configuration; and send, to the second device, the second configuration.

In some examples, the system may be implemented by a controller of a network. For instance, the controller may correspond to a feature offered by a service provider, such as Cisco's Catalyst SD-WAN Manager. In some examples, the configurations on devices in the network varies across different device types in terms of default configs, mutable and immutable configs, and hardware specific configuration differences. These differences may show up at run time, when running configuration of the device. Some configurations, for example, are enabled by default on these devices and can never be deleted (e.g., immutable configuration), such as physical interfaces on IOS-XE routers. On other platforms (e.g., such as Viptela devices), physical interfaces can be deleted from configurations. The configuration of a feature can also change dynamically based on the presence or absence of certain configurations.

In some examples, the user intent may comprise one or more configurations, one or more interfaces, and/or one or more features associated with a device. For instance, user intent may correspond to an action (e.g., adding, deleting, updating, enabling, disabling, etc.) associated with the configuration(s), interface(s), and/or feature(s) of the device.

In some examples, the first data and the second data may comprise lists of immutable configurations, mutable configurations, interface(s), and feature(s) of each respective device. In some examples, the lists indicate behavior of each device and/or behavior of configurations of each device.

In some examples, the common device configuration may comprise a single configuration copy. In some examples, the common device configuration may be merged with user intent and/or device data, such that the common device configuration may be applied to a plurality of different devices, regardless of device type, configuration(s), interface(s), or feature(s).

In some examples, the first device configuration and/or the second device configuration may be generated by a configuration module. In some examples, the system may comprise a configuration module. In some examples, the configuration module may be applied statically. For instance, the configuration module may enable a controller to understand what a device is capable of accepting in terms of configurations and may generate a device configuration that the device can accept based on the user intent. For instance, where user intent is associated with a configuration and/or device feature that comprise static configurations (e.g., such that the behavior of configurations of the device do not change dynamically), the configuration module may apply statically. In this example, the system may receive from a device, a list of immutable and mutable (e.g., default) configurations and features of the device at boot up (e.g., run time). The system may merge the list with the user intent when pushing the common device configuration, such that user intent may be pushed without being changed. Where the device has immutable configurations, the controller may have a view to this configuration after the merge, such that the controller may determine to not automatically delete this configuration during template push.

As an example, the configuration module may be configured such that the device configuration that is pushed to a particular device may include configurations that are applied to interfaces the device supports and may not include configurations that the device cannot support. In some examples, each of the device configurations that are pushed may be customized to the particular device (e.g., such that the device configuration pushed to a first device may be different from the device configuration pushed to a second device), while still using the single common device configuration. For instance, user intent may indicate that the user wants to delete an interface or a configuration on a device. In this example, the device data may indicate that the interface or the configuration is immutable (e.g., not capable of being deleted) on the device. In this example, the system may refrain from sending the configuration to the device, such that user intent will not fail.

In some examples, the system may determine that the user intent includes a configuration and/or interface that a particular device does not support. In this example, the particular device may send a message to the system indicating instructions (e.g., such as commands) that the configuration may include, such that the user intent is still met. Thus, the configuration module may enable the system to understand what a device is capable of accepting and may, in response, generate a device configuration that matches user intent and is a configuration that the device can accept.

In some examples, the configuration module may be applied dynamically. For instance, where user intent is associated with configuration of a feature on a device that can change dynamically, based on presence or absence of certain configurations. An example of a dynamic feature may include where "aaa new model" is present on a device (e.g., such as IOS-XE routers). In this example, a user can delete authentication configurations under "line vty" where the "aaa new model" configuration is present. Where the "aaa new model" configuration is absent, the same authentication configurations under "line vty" become immutable (e.g., such that a user cannot delete them). Another example, certain devices support crypto offload, while others don't. In this example, the system may receive from a device, a list of immutable and mutable (e.g., default) configurations and features of the device at boot up (e.g., run time). The system may merge the list with the user intent when pushing the common device configuration, such that user intent may be pushed without being changed. In this example, configurations may change behavior dynamically. Accordingly, the device first detects those configuration changes at boot up and may regenerate the list of configurations and features. This list is sent to the controller when it queries for the device configuration again before the next template push, thereby allowing the controller to use the same user intent even though the device behavior has changed.

In some examples, the system may notify a user where a configuration expressed in the user intent is not applicable and/or relevant to a device. In some examples, the controller may determine and/or identify that a configuration expressed in the user intent is not relevant to a particular device, based at least in part on the device data and/or the user intent. The system may display a notification to the user via a user interface and/or application.

In this way, the system may utilize a single common configuration to push the same the user intent to different device types, without the need to create and/or store multiple templates and/or store multiple copies of the templates, thereby streamlining and optimizing configuration management and reducing storage and computing resources required by the system. Moreover, a user of the described system does not need to know specific configuration(s), interface(s), feature(s), etc. each device type supports within a network, thereby improving user experience. Further, the system provides a controller the ability to identify configuration intent of a user and the ability for a controller to identify relevance of a configuration to a particular device, thereby providing intelligence to the controller and optimizing configuration management.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can optimize configuration management within SD-WAN networks. While the system 100 shows an example controller 104, it is understood that any of the components of the system may be implemented on any device in the network 102.

In some examples, the system 100 may include a network 102 that includes network devices (e.g., device(s) 114). The network 102 may include one or more networks implemented by any viable communication technology, such as wired and/or wireless modalities and/or technologies. The network 102 may include any combination of Personal Area Networks (PANs), software defined cloud interconnects (SDCI), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed, software defined WANs (SD-WANs)—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a controller 104. In some examples, the controller 104 corresponds to a system that has complete visibility into the security fabric of a given network (e.g., enterprise network, smaller network, etc. In some examples, the controller 104 may comprise a memory, one or more processors, etc. In some examples, the controller 104 may comprise a routing controller. In some examples, the controller 104 may be integrated as part of Cisco's vSmart feature, Cisco's vManage feature, Cisco's Catalyst SD-WAN Manager feature, and/or included in a SD-WAN architecture.

In some examples, the controller 104 may be configured to communicate with user device(s) 106. As illustrated, the user device(s) 106 may comprise an application 108. In some examples, the application 108 may correspond to an application provided by a service provider (e.g., such as Cisco) that enables an end user (e.g., administrator, etc.) of the network 102 to access the controller 104. For instance, the application 108 may correspond to Cisco's vManage feature and/or Cisco's Catalyst SD-WAN Manager feature. In some examples, the controller 104 may be configured to receive user intent 112 from the user device(s) 106 and/or application 108. In some examples, the user intent 112 may comprise instructions associated with one or more configurations, one or more interfaces, and/or one or more features associated with one or more device(s) 114 in a network 102. For instance, user intent may correspond to an action (e.g., adding, deleting, updating, enabling, disabling, etc.) associated with the configuration(s), interface(s), and/or feature(s) of the device(s) 114. For instance, user intent 112 may comprise instructions to push a new configuration (e.g., such as "aaa new model") to device 1 114A and device 3 114N.

The controller 104 may be configured to communicate with one or more network device(s) (e.g., device(s) 114). For instance, the controller 104 may receive network data (e.g., network traffic load data, network client data, etc.) or other data (e.g., application load data, data associated with WLCs, APs, etc.) from the device(s) 114. The device(s) 114 may comprise routers, switches, access points, stations, radios, and/or any other network device. In some examples, the device(s) 114 may monitor traffic flow(s) within the network and may report information associated with the traffic flow(s) to the controller 104.

In some examples, the device(s) 114 may communicate information. For instance, the device(s) 114 may send device data 116 to the controller 104. In some examples, the controller 104 may send a quer(ies) to device(s) 114 (e.g., device 1 114A, device 2 114B, and/or device 3 114N) based at least in part on the user intent 112. In response, one or more of the device(s) 114 (e.g., such as device 1 114A and device 3 114N) may send device data 116 to the controller 104. The device data 116 may comprise lists of immutable configurations, mutable configurations, interface(s), and/or feature(s) of each respective device. In some examples, the lists indicate behavior of each device and/or behavior of configurations of each device.

In some examples, the controller 104 may be configured to communicate and/or access database(s) 110. For instance, the controller 104 may create one or more device entries in the database(s) 110 in response to receiving the user intent 112. In some examples, the controller 104 may generate and merge a common device configuration with each of the device entries in the database(s) 110. In some examples, the controller 104 may store and/or merge device data 116 in the database(s) 110. For instance, the controller 104 may merge first device data 116A with the common device configuration and a device entry associated with device 1 114A.

In some examples, the controller 104 may be configured to send information to the device(s) 114. For instance, the controller 104 may generate and send configuration data 118 to the device(s) 114. In some examples, the controller 104 may send configuration data 118A to device 1 114A. In some examples, configuration data 118A may correspond to a customized configuration associated with device 1 114A. For instance, the controller 104 may merge user intent 112, device data 116A, and a common configuration template to create the configuration data 118A pushed to device 1 116A.

At "1", the system may receive user intent. For instance, the user intent may correspond to user intent 112. In some examples, the user intent 112 is received from an end user via user device 106. In some examples, the user indicates user intent 112 is to be applied to multiple device(s) 114. In some examples, user intent 112 comprises one or more configurations, one or more interfaces, and/or one or more features associated with a device. For instance, user intent may correspond to an action (e.g., adding, deleting, updating, enabling, disabling, etc.) associated with the configuration(s), interface(s), and/or feature(s) of the device.

At "2", the system may generate a common device configuration. In some examples, the common device configuration is generated based on the user intent 112. For instance, the common device configuration may comprise one or more actions or instructions associated with the user intent, in order for the device(s) to meet the user intent. In some examples, the common device configuration may correspond to a single template that can be utilized regardless of device type, hardware, interfaces, etc.

At "3", the system may receive device data from device(s). For instance, device data may correspond to device data 118 described above. In some examples, the device(s) 114 generate the device data 118 at boot up and/or in response to a query from the controller 104. As noted above, the device data may comprise a list of immutable configurations, mutable (e.g., default) configurations, interface(s), and device-specific feature(s). In some examples, the controller 104 may create device entries in the database 110 for each of the device(s) 114. In some examples, the controller 104 may store base device configuration entries in the database 110. In some examples, the controller 104 may merge the device data 118 into the respective device entries.

At "4", the system may generate configuration(s) for each of the device(s). For instance, the controller 104 may access the device entries in the database 110. The controller 104 may merge the common device configuration with a first device entry associated with a first device 114A. For instance, the controller 104 may generate a first device configuration associated with the device 1 114A based on identifying the difference between the base device configuration (e.g., existing device configuration) associated with device 1 114A and the common device configuration. The controller 104 may generate a second device configuration associated with device 3 114N based on identifying the differences between a based device configuration of device 3 114N and the common device configuration. In some examples, the first device configuration may include configuration(s), interface(s), feature(s), and/or commands associated with each that are specific to device 1 114A. In some examples, the second device configuration may include configuration(s), interface(s), feature(s), and/or command(s) that are specific to device 3 114N and/or that are different from the first device configuration. In some examples, the configuration(s) may correspond to configuration data 118.

In some examples, the system may generate the configuration(s) using a configuration module, described in FIG. 2 below. In some examples, the configuration(s) may be generated dynamically.

At "5", the system may send the configuration(s) to the device(s). For instance, the system may send the configuration(s) via network 102. In some examples, the system may push the configuration(s) to the device(s) 114.

In this way, the system may utilize a single common configuration to push the same the user intent to different device types, without the need to create and/or store multiple templates and/or store multiple copies of the templates, thereby streamlining and optimizing configuration management and reducing storage and computing resources required by the system. Moreover, a user of the described system does not need to know specific configuration(s), interface(s), feature(s), etc. each device type supports within a network, thereby improving user experience. Further, the system provides a controller the ability to identify configuration intent of a user and the ability for a controller to identify relevance of a configuration to a particular device, thereby providing intelligence to the controller and optimizing configuration management.

Figure 2:
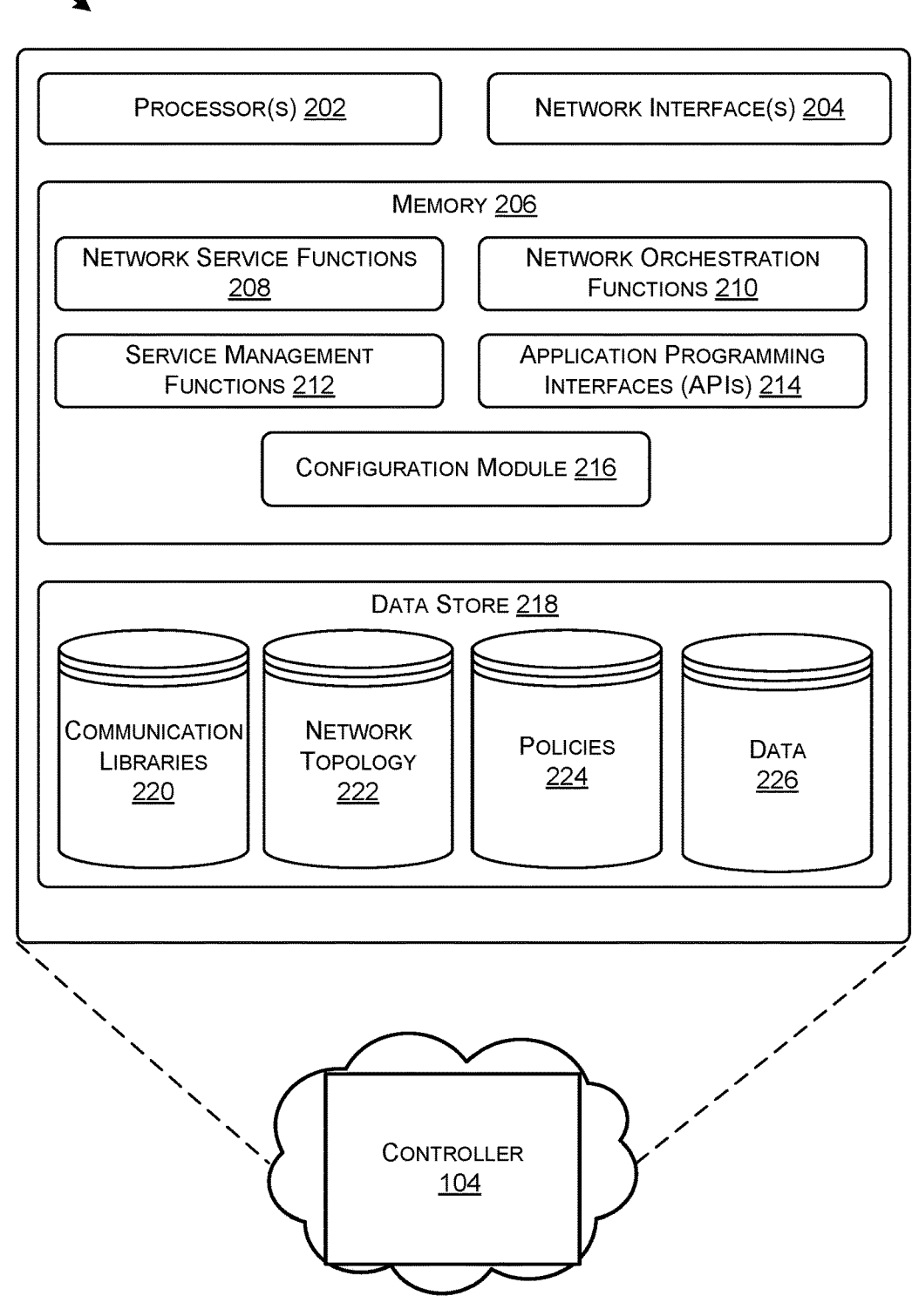
FIG. 2 illustrates a component diagram of an example controller described in FIG. 1.

FIG. 2 illustrates a component diagram of an example monitoring system described in FIG. 1. In some instances, the controller 104 may run on one or more computing devices in, or associated with, the network 102 (e.g., a single device or a system of devices). In some instances, the controller 104 may be integrated as part of a cloud-based management solution (e.g., such as Cisco's vManage feature and/or Cisco's Catalyst SD-WAN Manager).

Generally, the controller 104 may include a programmable controller that manages some or all of the control plane activities of the network 102, and manages or monitors the network state using one or more centralized control models.

As illustrated, the controller 104 may include, or run on, one or more hardware processors 202 (processors), one or more devices, configured to execute one or more stored instructions. The processor(s) 202 may comprise one or more cores. Further, the controller 104 may include or be associated with (e.g., communicatively coupled to) one or more network interfaces 204 configured to provide communications with network device(s) 114, the edge device(s) 106 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDWANs, SDCI's, and so forth. For example, the network interfaces 204 may include devices compatible with any networking protocol.

The controller 104 may also include memory 206, such as computer-readable media, that stores various executable components (e.g., software-based components, firmware-based components, etc.). The memory 206 may generally store components to implement functionality described herein as being performed by the controller 104. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the controller 104.

The controller 104 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the controller 104 may include a configuration module 216. In some examples, the configuration module 216 may be applied statically. For instance, the configuration module may enable the controller 104 to understand what a device is capable of accepting in terms of configurations and may generate a device configuration that the device can accept based on the user intent. For instance, where user intent is associated with a configuration and/or device feature that comprise static configurations (e.g., such that the behavior of configurations of the device do not change dynamically), the configuration module may apply statically. An example of a static configuration may be where a user intent indicates the user want to configure LTE on two devices. The first device may support LTE and the second device may not support LTE. The configuration module 216 may receive from the first device and the second device, list(s) of immutable and mutable (e.g., default) configurations and features of the device at boot up (e.g., run time). The configuration module 216 may merge the list with the user intent when pushing the common device configuration, such that user intent may be pushed without being changed. Where the device has immutable configurations, the controller may have a view to this configuration after the merge, such that the controller may determine to not automatically delete this configuration during template push. In the example described above, the configuration module 216 may push the configuration for LTE to the first device and may refrain from pushing the configuration to the second device.

As an example, the configuration module 216 may be configured such that the device configuration that is pushed to a particular device may include configurations that are applied to interfaces the device supports and may not include configurations that the device cannot support. In some examples, each of the device configurations that are pushed may be customized to the particular device (e.g., such that the device configuration pushed to a first device may be different from the device configuration pushed to a second device), while still using the single common device configuration. For instance, user intent may indicate that the user wants to delete an interface or a configuration on a device. In this example, the device data may indicate that the interface or the configuration is immutable (e.g., not capable of being deleted) on the device. In this example, the system may refrain from sending the configuration to the device, such that user intent will not fail.

In some examples, the configuration module 216 may determine that the user intent includes a configuration and/or interface that a particular device does not support. In this example, the particular device may send a message to the system indicating instructions (e.g., such as commands) that the configuration may include, such that the user intent is still met. Thus, the configuration module may enable the system to understand what a device is capable of accepting and may, in response, generate a device configuration that matches user intent and is a configuration that the device can accept.

In some examples, the configuration module 216 may be applied dynamically. For instance, where user intent is associated with configuration of a feature on a device that can change dynamically, based on presence or absence of certain configurations. An example of a dynamic feature may include where "aaa new model" is present on a device (e.g., such as IOS-XE routers). In this example, a user can delete authentication configurations under "line vty" where the "aaa new model" configuration is present. Where the "aaa new model" configuration is absent, the same authentication configurations under "line vty" become immutable (e.g., such that a user cannot delete them). Another example, certain devices support crypto offload, while others don't. In this example, the configuration module 216 may receive from a device, a list of immutable and mutable (e.g., default) configurations and features of the device at boot up (e.g., run time). The configuration module 216 may merge the list with the user intent when pushing the common device configuration, such that user intent may be pushed without being changed. In this example, configurations may change behavior dynamically. Accordingly, the device first detects those configuration changes at boot up and may regenerate the list of configurations and features. This list is sent to the controller 104 when it queries for the device configuration again before the next template push, thereby allowing the controller to use the same user intent even though the device behavior has changed.

In some examples, the configuration module 216 may notify a user where a configuration expressed in the user intent is not applicable and/or relevant to a device. In some examples, the controller 104 may determine and/or identify that a configuration expressed in the user intent is not relevant to a particular device, based at least in part on the device data and/or the user intent. The configuration module 216 may cause a notification to be displayed the user via a user interface and/or application.

The controller 104 may further include a data store 218, such as long-term storage, that stores communication libraries 220 for the different communication protocols that the controller 104 is configured to use or perform. Additionally, the data store 218 may include network topology data 222, such as a model representing the layout of the network components in the network 102 and/or data indicating available bandwidth, available CPU, delay between nodes, computing capacity, processor architecture, processor type(s), etc., The data store 218 may store policies 224 that includes security data associated with the network, security policies configured for the network, data policies, firewall policies, firewall configuration data, compliance policies configured for the network, policies associated with the control policy sequence(s), etc., The data store 218 may store data 226 that may include device entries, device data, configuration data, user intent, or any other type of information described herein.

In this way, the controller may utilize a single common configuration to push the same the user intent to different device types, without the need to create and/or store multiple templates and/or store multiple copies of the templates, thereby streamlining and optimizing configuration management and reducing storage and computing resources required by the system. Further the current techniques provide the controller the ability to identify configuration intent of a user and the ability for a controller to identify relevance of a configuration to a particular device, thereby providing intelligence to the controller and optimizing configuration management.

Figure 3A:
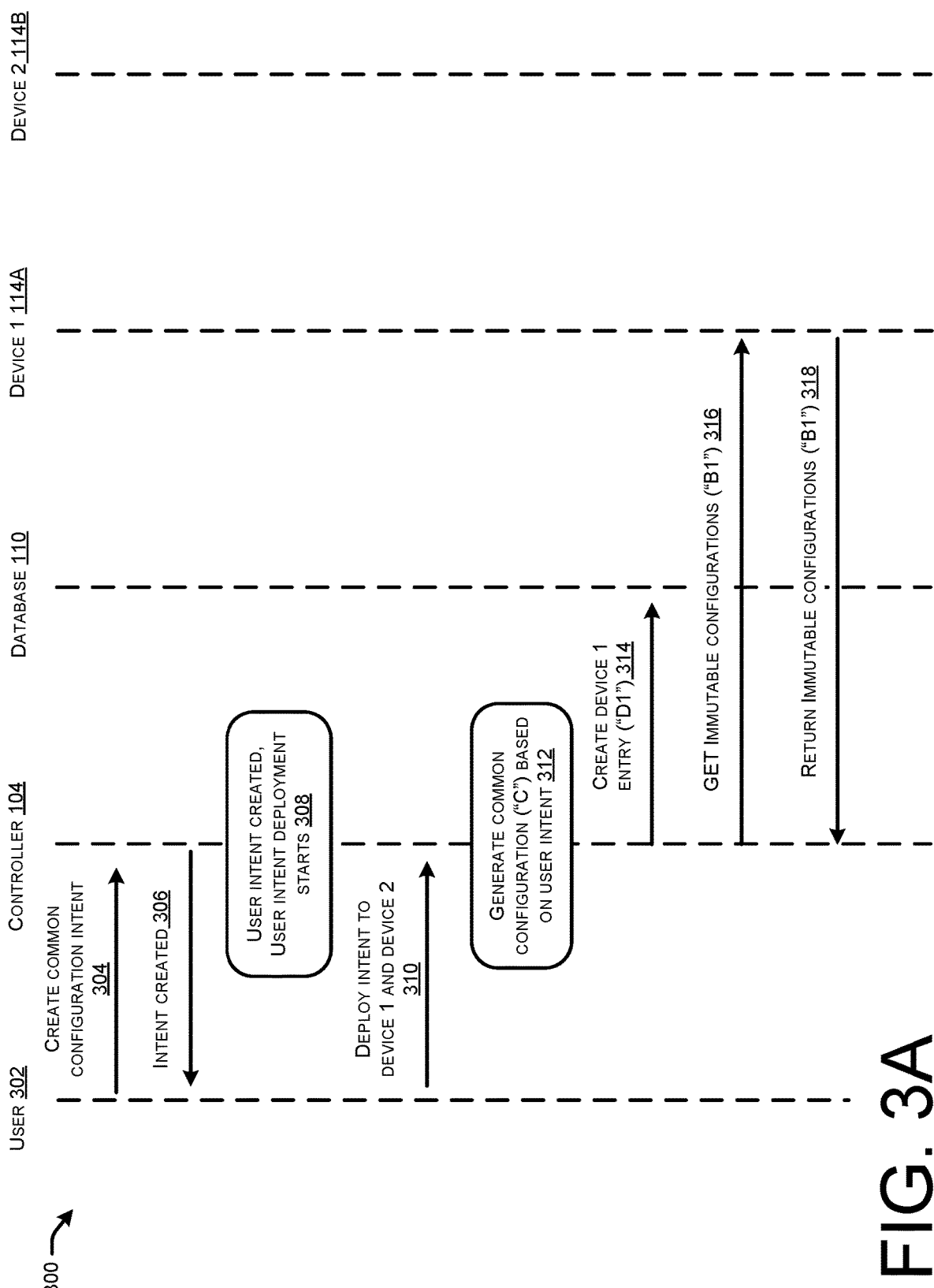
FIGS. 3A-3C illustrate a flow diagram of example communications corresponding to configuration generation on a controller according to the techniques described in FIGS. 1 and 2.
Figure 3B:
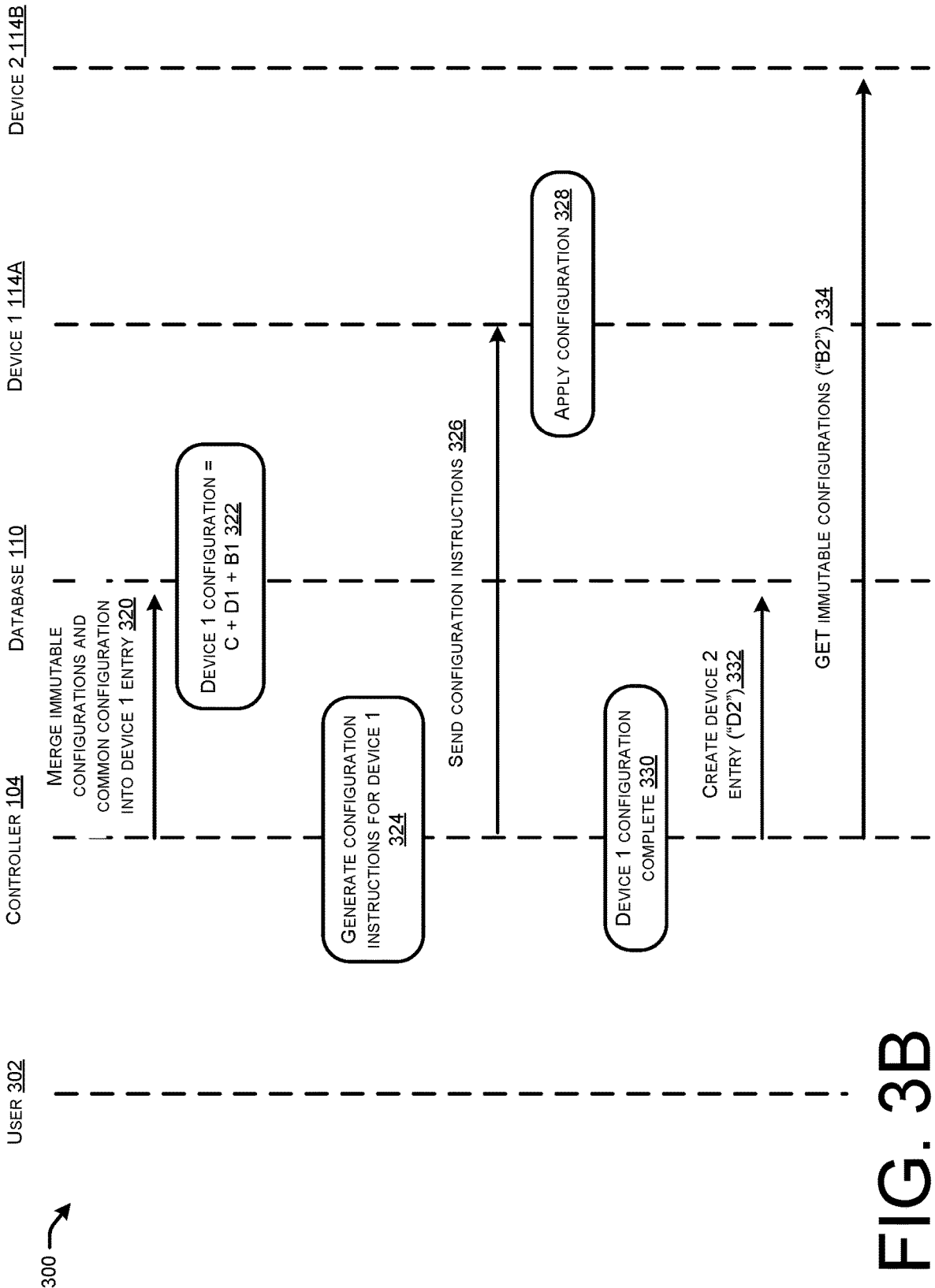
Figure 3C:
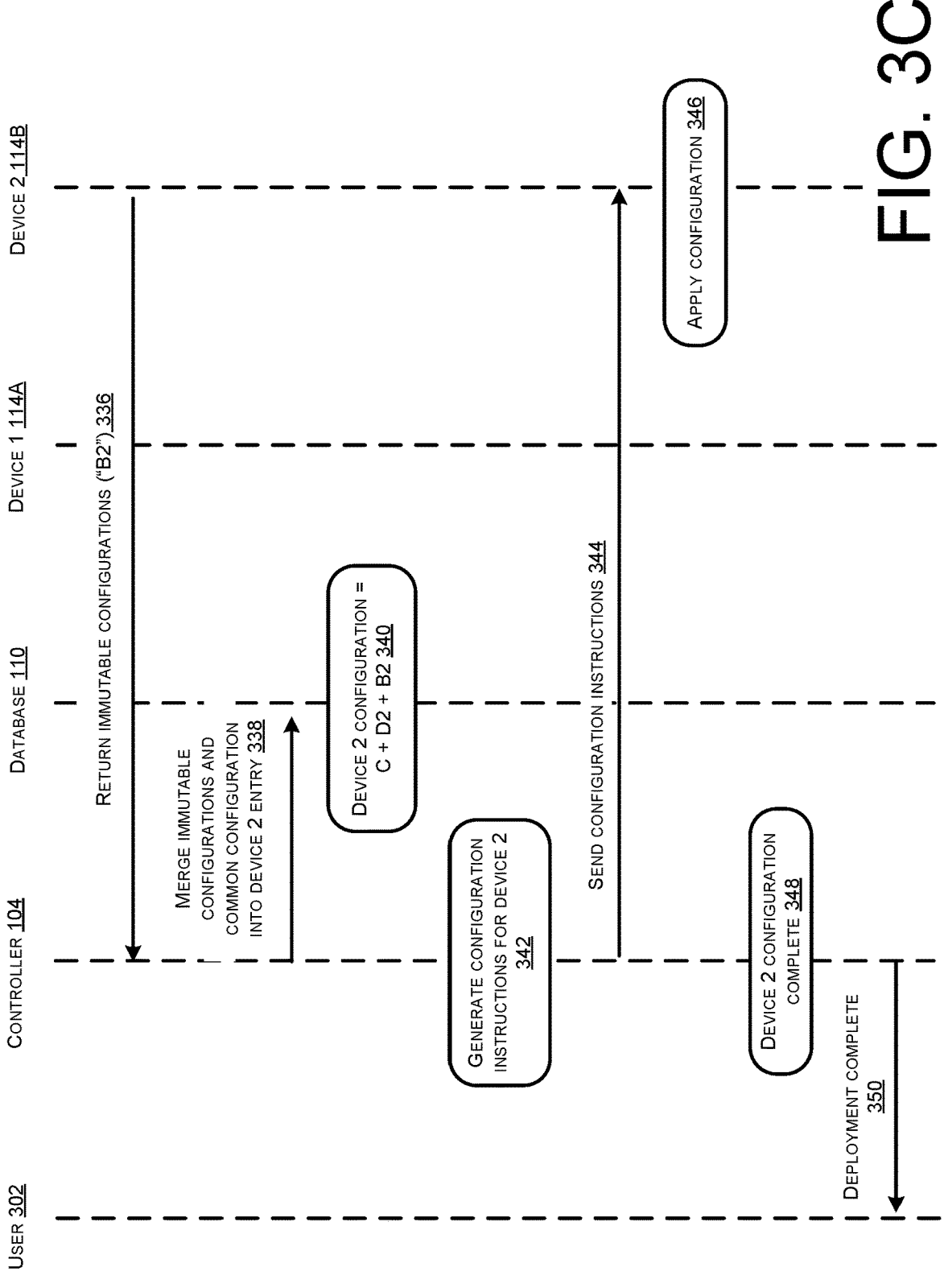

FIGS. 3A-3C a flow diagram of example communications 300 corresponding to configuration generation on a controller according to the techniques described in FIGS. 1 and 2. For instance, a user 302 may correspond to an end user (e.g., such as a network administrator) and/or user device 106. In some examples, the end user 302 corresponds to a user accessing the controller 104 via application 108. As illustrated, the communications 300 may include controller 104, database 110, device 1 114A, and device 2 114B.

As illustrated in FIG. 3A, at 304 the user 302 may send instructions to create a common configuration intent to the controller 104. In some examples, the common configuration intent corresponds to user intent 112. In some examples, the user 302 identifies device 1 114A and device 2 114B to apply the common configuration intent to.

At 306, the controller 104 sends an indication to the user 302 that the intent has been created. At 308, the controller 104 may store an indication that the user intent is created and may launch a process to deploy the user intent.

At 310, the user 302 may send instructions to the controller 104 to deploy the user intent to device 1 and device 2.

At 312, the controller 104 may generate a common configuration ("C") based on the user intent. In some examples, the common configuration corresponds to the common device configuration described above.

At 314, the controller 104 may send instructions to the database 110 to create a first entry for device 1 ("D1"). In some examples, the device 1 entry ("D1") correspond to a base device configuration entry associated with device 1 114A.

At 316, the controller 104 may send a GET request to device 1 114A for immutable configurations ("B1") of device 1 114A. In some examples, the GET request is sent to device 1 114A at boot up.

At 318, device 1 114A may return the immutable configurations ("B1") to the controller 104. In some examples, the immutable configurations are returned as part of device data 118 described above.

As illustrated in FIG. 3B, at 320 the controller 104 may send instructions to the database 110 to merge the immutable configurations ("B1") and the common configuration ("C") into device 1 entry ("D1"). For instance, the controller may send first instructions to merge the immutable configurations ("B1") into the device 1 entry ("D1"). The controller may then send second instructions to merge the common configuration ("C") into the device 1 entry ("D1").

At 322, the database 110 may store the device 1 configuration. As illustrated, the device 1 configuration=C+D1+B1. In some examples, the device 1 configuration may be used by the controller to determine configuration data 118 to send to device 1 114A.

At 324, the controller 104 may generate configuration instructions for device 1. For instance, the configuration instructions may comprise the differences between the device 1 configuration and an existing device configuration associated with device 1 114A. In some examples, the configuration instructions correspond to configuration data 118 described above.

At 326, the controller 104 may send the configuration instructions to device 1 114A. For instance, the controller 104 may push the configuration instructions to device 1 114A.

At 328, device 1 114A may apply the configuration. For instance, device 1 114A may apply the configuration instructions sent by the controller 104.

At 330, the controller 104 may store and/or output an indication that configuration of device 1 114A is complete.

At 332, the controller 104 may send instructions to the database 110 to create an entry for device 2 ("D2"). In some examples, the device 2 entry ("D2") correspond to a base device configuration entry associated with device 2 114B.

At 334, the controller 104 may send a GET request to device 2 114B for immutable configurations ("B2") of device 2 114B. In some examples, the GET request is sent to device 2 114B at boot up.

As illustrated in FIG. 3C, at 336, device 2 114B may return the immutable configurations ("B2") to the controller 104. In some examples, the immutable configurations are returned as part of device data 118 described above.

At 338, the controller 104 may send instructions to the database 110 to merge the immutable configurations ("B2") and the common configuration ("C") into device 2 entry ("D2"). For instance, the controller may send first instructions to merge the immutable configurations ("B2") into the device 2 entry ("D2"). The controller may then send second instructions to merge the common configuration ("C") into the device 2 entry ("D2").

At 340, the database 110 may store the device 2 configuration as. As illustrated, the device 2 configuration=C+D2+ B2. In some examples, the device 2 configuration may be used by the controller to determine configuration data 118 to send to device 2 114B.

At 342, the controller 104 may generate configuration instructions for device 2 114B. For instance, the configuration instructions may comprise the differences between the device 2 configuration and an existing device configuration associated with device 2 114B. In some examples, the configuration instructions correspond to configuration data 118 described above.

At 344, the controller 104 may send the configuration instructions to device 2 114B. For instance, the controller 104 may push the configuration instructions to device 2 114B. As noted above, the configuration instructions sent to device 2 114B may be different from the configuration instructions sent to device 1 114A.

At 346, device 2 114B may apply the configuration. For instance, device 2 114B may apply the configuration instructions sent by the controller 104.

At 348, the controller 104 may store and/or output an indication that configuration of device 2 is complete. For instance, the controller 104 may store an indication in memory of the controller and/or in database 110.

At 350, the controller 104 may send an indication and/or notification to the user 302 that deployment is complete. For instance, the controller 104 may cause application 108 to display a user interface that includes the notification.

Figure 4:
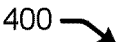
FIG. 4 illustrates a flow diagram of an example method for optimizing configuration management associated with the system described in FIGS. 1-3.
Figure 4:
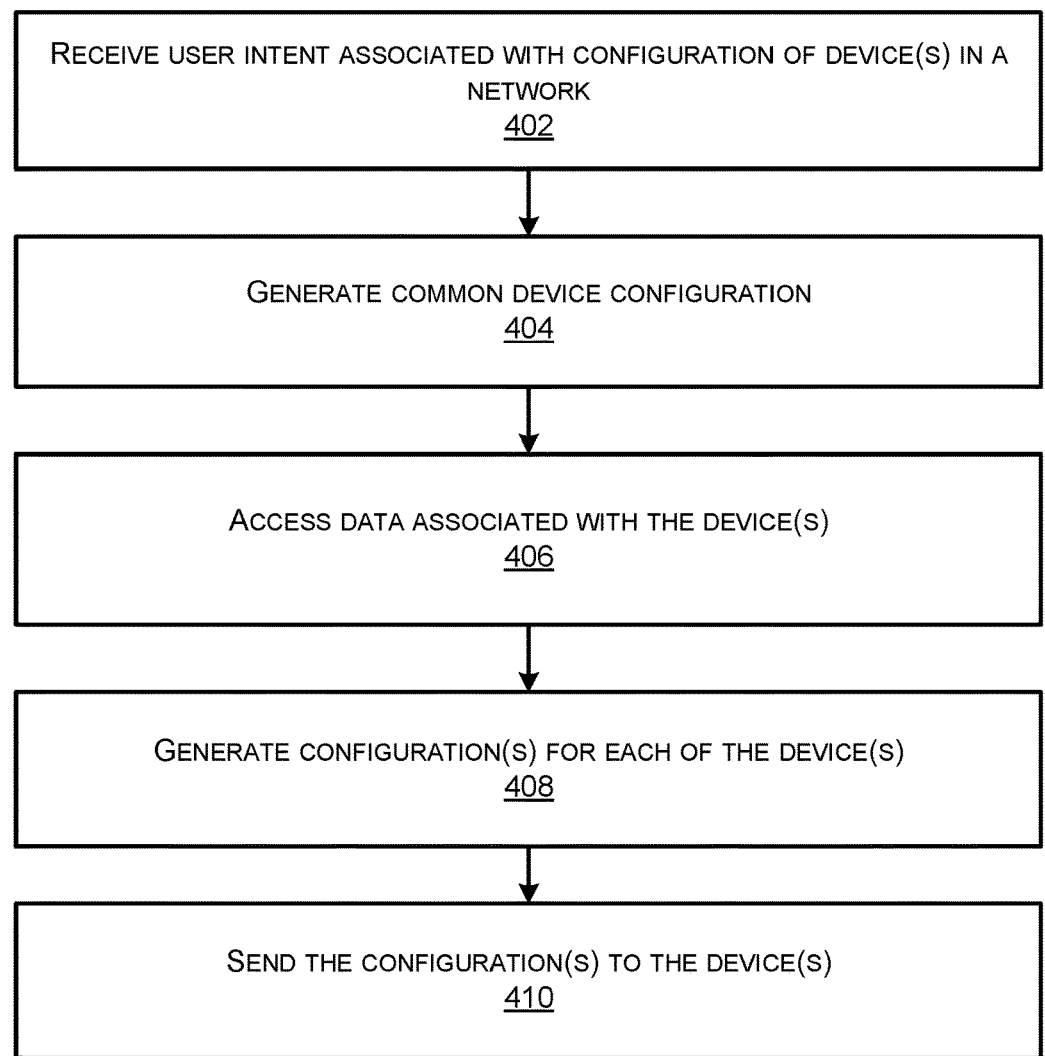

FIG. 4 illustrates a flow diagram of an example system 400 for optimizing configuration management associated with the system described in FIGS. 1-3. In some instances, the steps of system 400 may be performed by one or more devices (e.g., controller 104, network device(s) 114, etc.)

that include one or more processors and one or more non-transitory computer-readable media storing computer-executable instructions that, when executed by the one or more processors, cause the one or more processors to perform operations of system 400.

At 402, the system may receive user intent associated with configuration of device(s) in a network. In some examples, the network may comprise network 102. In some examples, user intent comprises user intent 112. In some examples, the system may receive the user intent from an application 108 of a user device 106. In some examples, the user intent may apply to multiple device(s) 114 within the network 102.

At 404, the system may generate a common device configuration. For instance, the common device configuration may be based on user intent 112.

In some examples, the system may create, in response to generating the common device configuration, a first entry associated with the first device in a database associated with the controller. For instance, the database may correspond to database 110. The system may receive the first data from the first device. In some examples, the system may merge the first data and the common device configuration to create merged first data. In some examples, the system may store, in association with the first entry, the merged first data. In some examples, the system may receive first data from the first device and second data from a second device. In some examples, the system may receive the first data and the second data at runtime and/or bootup of the first device and/or second device.

At 406, the system may access data associated with the device(s). For instance, the system may access first data associated with a first device of the device(s) and/or second data associated with a second device of the device(s). In some examples, the first data comprises a list of immutable configurations associated with the first device and default configurations associated with the first device. In some examples, the list further includes interfaces associated with the first device. In some examples, the first data corresponds to device data 116. In some examples, the system may access the data from database 110. For instance, the system may access the first data from a first device entry associated with the first device.

At 408, the system may generate configuration(s) for each of the device(s). For instance, the system may generate a first configuration for a first device of the device(s) and a second configuration for a second device of the device(s). In some examples, the first configuration is generated based at least in part on merging the user intent with the merged first data. In some examples, the first configuration corresponds to differences between an existing configuration associated with the first device and the merged configuration stored in database 110. In some examples, the first configuration is customized based on the first data and the second configuration is customized based on the second data.

In some examples, the system may determine, based at least in part on the first data, that user intent and at least one portion of the first data do not match. For instance, the system may determine that a configuration, feature, interface, etc. included in the user intent is not supported by the first device. In this example, the system may take an action, such as notifying the user via a user interface and/or refrain from including the at least one portion of the first data in the first configuration.

At 410, the system may send the configuration(s) to the device(s). For instance, the system may push the first configuration to the first device, such as via network 102.

The system may push the second configuration to the second device, such as via network 102.

In this way, the system may utilize a single common configuration to push the same the user intent to different device types, without the need to create and/or store multiple templates and/or store multiple copies of the templates, thereby streamlining and optimizing configuration management and reducing storage and computing resources required by the system. Moreover, a user of the described system does not need to know specific configuration(s), interface(s), feature(s), etc. each device type supports within a network, thereby improving user experience. Further, the system provides a controller the ability to identify configuration intent of a user and the ability for a controller to identify relevance of a configuration to a particular device, thereby providing intelligence to the controller and optimizing configuration management.

Figure 5:
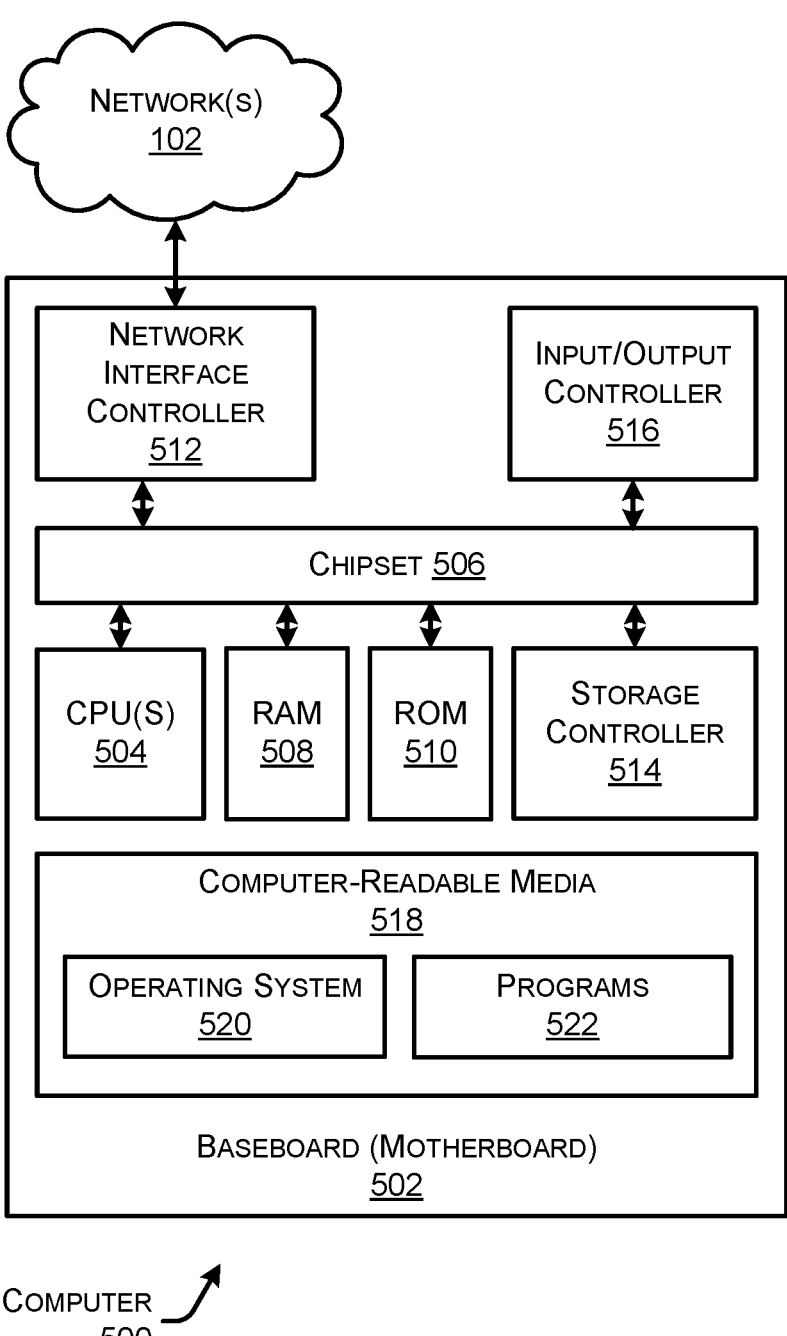
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a controller 104 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs 504") operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the controller 104 and/or any components included therein, may be supported by one or more devices similar to computer 500. Stated otherwise, some or all of the operations performed by the controller 104 and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a controller 104 and/or any other device. The computer 500 may include one or more hardware processors (processor(s) 504) configured to execute one or more stored instructions. The processor(s) 504 may comprise one or more cores. Further, the computer 500 may include one or more network interfaces configured to provide communications between the computer 500 and other devices, such as the communications described herein as being performed by the controller 104 and/or any other device. The network interfaces may include devices configured to couple to personal area networks (PANs), wired and wireless local area networks (LANs), wired and wireless wide area networks (WANs), SDWANs, and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including receiving user intent associated with configuration of one or more devices; generating, based on the user intent, a common device configuration; accessing first data associated with a first device of the one or more devices and second data associated with a second device of the one or more devices; generating, based on the user intent, the first data, and the common device configuration, a first configuration associated with the first device; generating, based on the user intent, the second data, and the common device configuration, a second configuration associated with the second device; sending, to the first device, the first configuration; and sending, to the second device, the second configuration.

In this way, the computer 500 can utilize a single common configuration to push the same the user intent to different device types, without the need to create and/or store multiple templates and/or store multiple copies of the templates, thereby streamlining and optimizing configuration management and reducing storage and computing resources required by the system. Moreover, a user of the described system does not need to know specific configuration(s), interface(s), feature(s), etc. each device type supports within a network, thereby improving user experience. Further, the system provides a controller the ability to identify configuration intent of a user and the ability for a controller to identify relevance of a configuration to a particular device, thereby providing intelligence to the controller and optimizing configuration management.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for intent-based networking implemented by a controller of a network, the method comprising:

receiving user intent associated with pushing a common configuration to both of a first device and a second device;

generating, based on the user intent, a common device configuration;

accessing first data associated with the first device and second data associated with the second device, the first data specifying a first immutable configuration for the first device and the second data specifying a second immutable configuration for the second device;

generating, based on the user intent, the first data, and the common device configuration, a first configuration associated with the first device, the first configuration being generated at least partly by merging the common device configuration with the first immutable configuration;

generating, based on the user intent, the second data, and the common device configuration, a second configuration associated with the second device, the second configuration being generated at least partly by merging the common device configuration with the second immutable configuration;

sending, to the first device, the first configuration; and sending, to the second device, the second configuration.

2. The method of claim 1, wherein the first data comprises a list of immutable configurations associated with the first device and default configurations associated with the first device.

3. The method of claim 2, wherein the list further includes interfaces associated with the first device.

4. The method of claim 1, further comprising:

creating, in response to generating the common device configuration, a first entry associated with the first device in a database associated with the controller;

receiving the first data from the first device;

merging the first data and the common device configuration to create merged first data; and storing, in association with the first entry, the merged first data.

5. The method of claim 4, wherein the first configuration is generated based at least in part on merging the user intent with the merged first data.

6. The method of claim 1, wherein the first configuration is customized based on the first data and the second configuration is customized based on the second data.

7. The method of claim 1, further comprising receiving the first data and the second data at runtime.

8. The method of claim 1, further comprising:

determining, based at least in part on the first data, that user intent and at least one portion of the first data do not match; and refraining from including the at least one portion of the first data in the first configuration.

9. A system configured to perform intent-based networking, comprising:

one or more processors; and one or more non-transitory computer-readable media storing instructions executable by the one or more processors, wherein the instructions program the one or more processors to perform operations comprising:

receiving user intent associated with pushing a common configuration to both of a first device and a second device;

generating, based on the user intent, a common device configuration;

accessing first data associated with the first device and second data associated with the second device, the first data specifying a first immutable configuration for the first device and the second data specifying a second immutable configuration for the second device;

generating, based on the user intent, the first data, and the common device configuration, a first configuration associated with the first device, the first configuration being generated at least partly by merging the common device configuration with the first immutable configuration;

generating, based on the user intent, the second data, and the common device configuration, a second configuration associated with the second device, the second configuration being generated at least partly by merging the common device configuration with the second immutable configuration;

sending, to the first device, the first configuration; and sending, to the second device, the second configuration.

10. The system of claim 9, wherein the first data comprises a list of immutable configurations associated with the first device and default configurations associated with the first device.

11. The system of claim 10, wherein the list further includes interfaces associated with the first device.

12. The system of claim 9, the operations further comprising:

creating, in response to generating the common device configuration, a first entry associated with the first device in a database associated with the system;

receiving the first data from the first device;

merging the first data and the common device configuration to create merged first data; and storing, in association with the first entry, the merged first data.

13. The system of claim 12, wherein the first configuration is generated based at least in part on merging the user intent with the merged first data.

14. The system of claim 9, wherein the first configuration is customized based on the first data and the second configuration is customized based on the second data.

15. The system of claim 9, the operations further comprising receiving the first data and the second data at runtime.

16. The system of claim 9, the operations further comprising:

determining, based at least in part on the first data, that the user intent and at least one portion of the first data do not match; and refraining from including the at least one portion of the first data in the first configuration.

17. One or more non-transitory computer-readable media maintaining instructions for intent-based networking that, when executed by one or more processors, program the one or more processors to perform operations comprising:

receiving user intent associated with pushing a common configuration to both of a first device and a second device;

generating, based on the user intent, a common device configuration;

accessing first data associated with the first device and second data associated with the second device, the first data specifying a first immutable configuration for the first device and the second data specifying a second immutable configuration for the second device;

generating, based on the user intent, the first data, and the common device configuration, a first configuration associated with the first device, the first configuration being generated at least partly by merging the common device configuration with the first immutable configuration;

generating, based on the user intent, the second data, and the common device configuration, a second configuration associated with the second device, the second configuration being generated at least partly by merging the common device configuration with the second immutable configuration;

sending, to the first device, the first configuration; and sending, to the second device, the second configuration.

18. The one or more non-transitory computer-readable media of claim 17, wherein the first data comprises a list of immutable configurations associated with the first device and default configurations associated with the first device.

19. The one or more non-transitory computer-readable media of claim 17, wherein the first configuration is customized based on the first data and the second configuration is customized based on the second data.

20. The one or more non-transitory computer-readable media of claim 17, the operations further comprising receiving the first data and the second data at runtime.

* * * * *